United States Patent [19]

Cwejman

[11] Patent Number: 5,459,387
[45] Date of Patent: Oct. 17, 1995

[54] CONTROL DEVICE FOR ELECTRIC MOTORS

[76] Inventor: Wlodzimierz Cwejman, PL 4806, S-440 33 Harestad, Sweden

[21] Appl. No.: 290,863
[22] PCT Filed: Feb. 17, 1993
[86] PCT No.: PCT/SE93/00122
§ 371 Date: Aug. 18, 1994
§ 102(e) Date: Aug. 18, 1994
[87] PCT Pub. No.: WO93/17490
PCT Pub. Date: Sep. 2, 1993

[30] Foreign Application Priority Data

Feb. 20, 1992 [SE] Sweden ................... 9200505

[51] Int. Cl.⁶ .................... H02P 7/622; H02P 7/628
[52] U.S. Cl. .............. 318/808; 318/805; 318/810; 318/811
[58] Field of Search .................... 318/767, 798, 318/799, 800, 801, 805, 807, 808, 810, 811, 812

[56] References Cited

U.S. PATENT DOCUMENTS

| | | |
|---|---|---|
| 3,529,223 | 9/1970 | Vergez, Jr. . |
| 3,648,138 | 3/1972 | Kalis . |
| 4,057,228 | 11/1977 | Volker et al. . |
| 4,071,900 | 1/1978 | Jensen . |
| 4,145,647 | 3/1979 | Nielsen et al. . |
| 5,194,797 | 3/1993 | Kahkipuro . |

FOREIGN PATENT DOCUMENTS 0113503  7/1984  European Pat. Off. .

Primary Examiner—Bentsu Ro
Attorney, Agent, or Firm—Lerner, David, Littenberg, Krumholz & Mentlik

[57] ABSTRACT

Device for controlling electric motors of the asynchronous motor type operated by means of three-phase alternating current. For producing the operating current of the motor (5) a voltage-controlled oscillator (2) is foreseen and a generator (4, 6) controlled by the same and conditionally fed from a direct current source (1). The control device (3, 7, 8) is arranged to receive the pulse which arises upon operation of the motor (5) in its feed conductors (10–12) for alternating current and is thereby arranged to detect changes in the pulse shape of the operating voltage which occur due to electromotive forces induced from the motor windings when these are passed by the induced field of the rotor. These changes vary with the size of the slip. On the basis of the level of said deviations, a proportional voltage is induced which is transferred to the oscillator for its frequency control. With changes in the rotational torque loading on the motor, the control voltage is thereby changed and also the frequency of the oscillator and consequently the rotational speed of the motor, so that an adaptation to the operating resistance is obtained.

3 Claims, 2 Drawing Sheets

FIG. 2
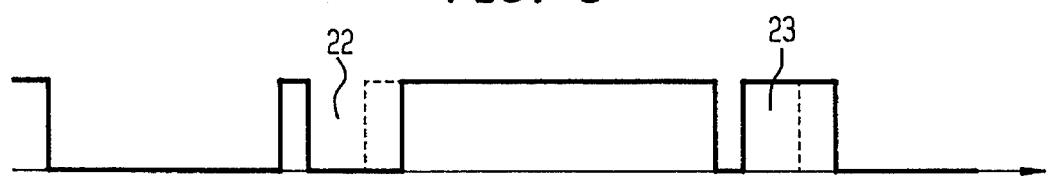
FIG. 3
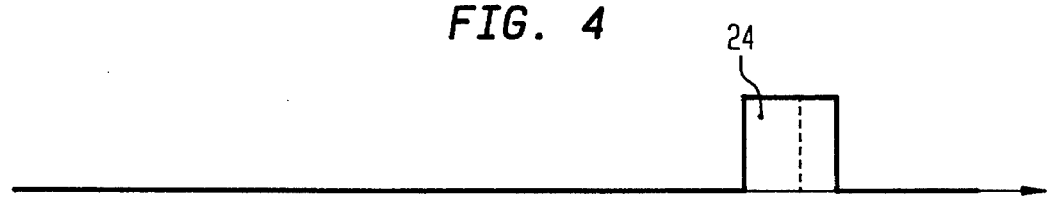
FIG. 4
FIG. 5
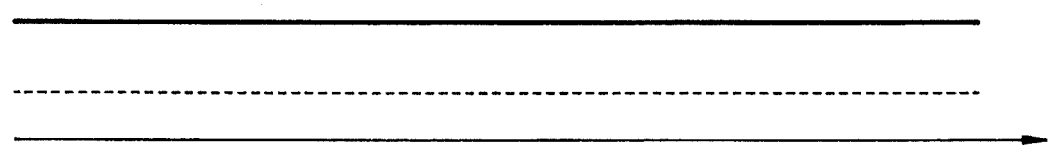

5,459,387

CONTROL DEVICE FOR ELECTRIC MOTORS

TECHNICAL FIELD

The present invention relates to control devices for electric motors according to the preamble of claim 1. The control device is intended to control the output of the motor depending on the applied load. The device is arranged to achieve this control in an electrical way by means of an electronic circuit.

STATE OF THE ART

There are a number of types of electric motor which operate according to varying principles and which have different constructions and control means. A current important type of motor is intended to function with current from a direct current source; this often concerning vehicle equipment or motors in mobile equipment such as battery-operated tools.

For direct operation with direct current, commutator motors having brush-commutation or electronic type commutation can be used. These motors are however relatively expensive to produce since they have both stator windings as well as rotor windings, added to which comes the commutator circuit if no brush commutator is used which in turn gives a limited operation time between servicing. Thus a different type of motor driven via an alternating current transformer has been used increasingly, namely synchronous motors often with permanent magnets. Even these motors are however relatively expensive to produce and, for certain purposes, do not allow adequate regulation.

Asynchronous motors with short-circuited rotors have achieved very widespread use for alternating current operation. This has occurred because the type of motor is robust and, above all, cheap to produce since the rotor with its single short-circuited windings requires very little work.

With an asynchronous motor the field is produced in the short-circuited rotor by means of the rotating field of the stator which is formed by using three-phase power or which respectively can be produced by using single-phase along with the provision of auxiliary circuits. In order for this to occur, a certain slip of the rotor with respect to its synchronism with the stator field is required, so that this passes the short-circuited windings of the rotor. A greater produced torque requires a greater induced field in the rotor, which arises since the larger the load, the larger slip. With very large slip the torque development starts to decrease with the risk that the motor will fall out and stop. Such low torque development can also occur at the start, the asynchronous motor having a low starting torque from rest. These characteristics and limitations have resulted in the fact that the motor has achieved only limited use for said direct current applications even though the use of the necessary alternating current transformer for the operation of the motor is today not regarded as any appreciable disadvantage.

OBJECT OF THE INVENTION AND ITS SOLUTION

The object of the invention is to assign a control circuit for operation of asynchronous motors and in particular for operation of such motors from a direct current source. Thus the device should overcome said disadvantages and achieve a motor operation which is suited to the torque load en the motor and which thus even allows a favourable starting cycle.

This is achieved by the features defined in the characterising portion of claim 1. More particularly, use is made of sensing an arising electromotive force caused by the slip when a rotor winding current becomes zero. The size and the duration of this EMF increases with increasing slip and consequently also with increased loading. This can be seen when operating using square pulse, whilst when operating with sine waves the relationship is not as easily detectable.

Using electronic means, the size and the endurance of the change in the EMF can be measured and used for controlling the motor. The change has a certain proportionality to the slip and thus to the torque load. If a control device is arranged to control the value of the EMF through change of the operating frequency, a motor is obtained which works with relatively constant developed torque but varying rotational speed. This creates even further improved torque conditions for starting.

Moreover an intelligent regulation can be achieved for operating conditions where the resistance torque decreases with decreasing rotational speed which is the case for acceleration pumps and fans, so that a throttling of the flow which gives rise to larger current resistance reduces the rotational speed and therewith the pump/fan pressure.

A possible application with this idea is that this possibility will be used for operation of particular pumps and fans for which flow regulation is required. Flow regulation occurs via throttling of the flow which gives rise to said effect that the motor's rotational speed is adapted to the increased resistance upon throttling so that the produced flow is adapted to the requirement of an energy-economical operation.

Said control can additionally be used basically to make asynchronous motors suitable for direct current operation, since presently in many fields of application only permanent-magnet synchronous motors with electronic commutation can be used, in those cases particularly having a requirement for long service intervals where brush commutations is not acceptable.

DESCRIPTION OF THE DRAWINGS

An embodiment of the invention will now be described with reference to the accompanying drawings in which:

FIG. 2–5 show a number of diagrams depicting the pulse condition during motor operation.

DESCRIPTION OF PREFERRED EMBODIMENTS

Figure 1:
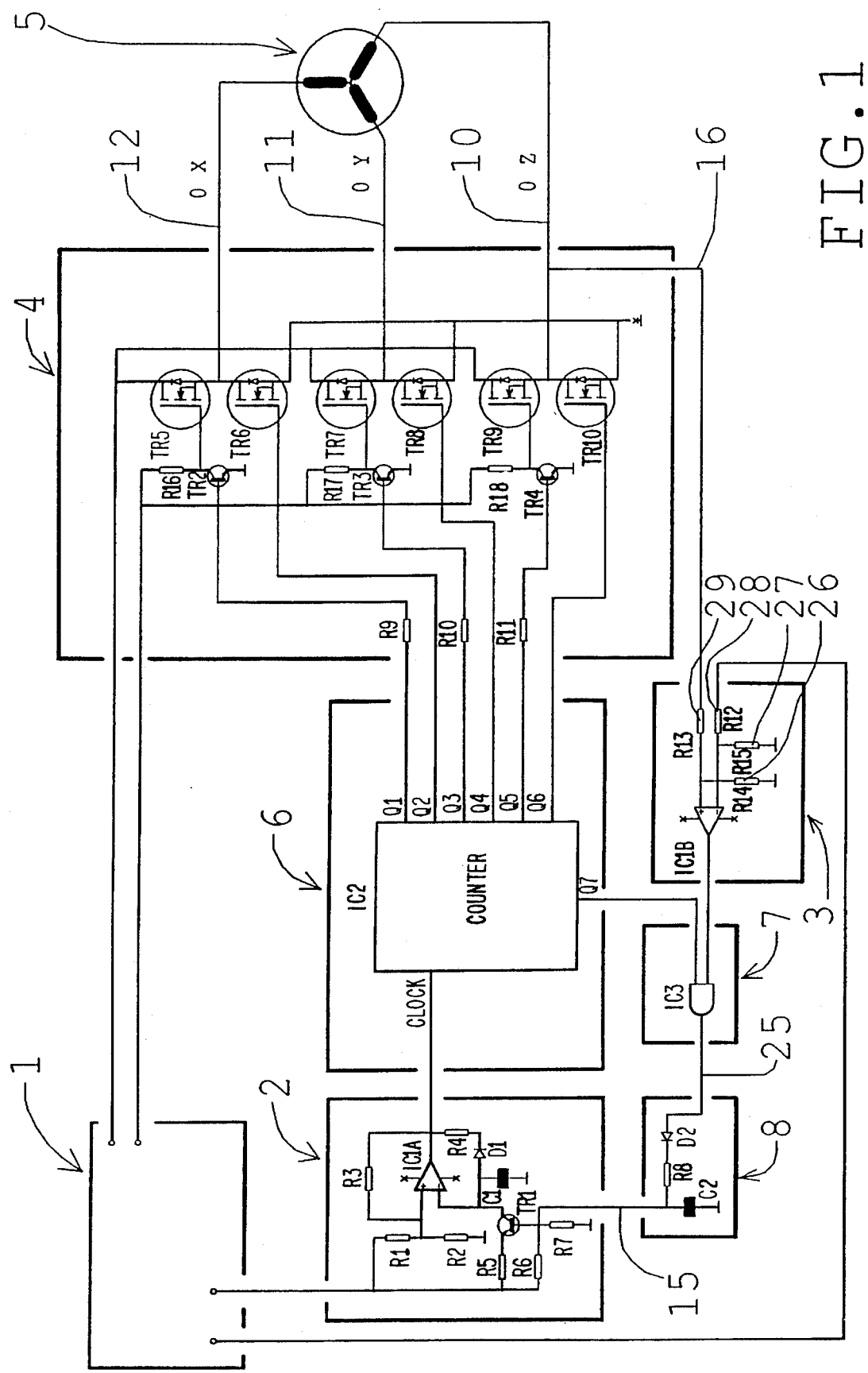
FIG. 1 shows a diagram of the preferred embodiment of the control circuit.

FIG. 1 shows a diagram where the component details are divided into a number of function blocks formed by encircling lines. Reference numeral 1 defines a direct current source, preferably a battery. To this are directly connected a voltage control oscillator 2, a comparator 3 and a bridge 4 in order to achieve a three-phase operating current which is fed to the stator windings of a short-circuited asynchronous motor 5. Between the oscillator and the bridge for achieving operating current, a generator 6 is connected for controlling the bridge. A transformer 8 is connected to the comparator 3 via a pulse separator 7 for transforming the pulse train from the separator 7 to a direct current which is lead to the oscillator for voltage control of the same. The separator is further connected to the generator 6. Besides said connections to the current source 1 and to the separator 7, the comparator 3 is connected to one of the motors feed windings which are denoted by 10, 11 and 12.

FIG. 1 shows the included electronic components inside the separate blocks with the usual symbols. The choice of the type of components, their performance and connection can be varied within the scope of the invention depending on the requirements for the operating conditions, cost considerations and component availability, and can even depend on the production of new types of components which are suitable for application in the present connection. The detailed construction of the device will therefore not be described more closely than is necessary for understanding the main idea behind the invention.

With respect to these circuits for producing the operating currents to the motor 5 and consequently to the oscillator 2, the generator 6 and motor bridge 4, these are constructed according to known principles for producing a three-phase current via feeding from a direct current source. Thus with the present construction of the voltage-controlled oscillator it is the case that the frequency of the operating current is dependent on the voltage of the control current, which at 15 is transferred to the oscillator from the transformer 8. With a change in the oscillator frequency the rotational speed of the motor is also changed.

Concerning the problem which is to be solved by the invention and which is defined in the introduction, the rotational speed of the motor is to be adapted according to the operating torque in such a way that the slip does not increase to such a value that the motor falls out and stops. This is achieved according to the invention in that the frequency of the operating current is adapted to the torque conditions and, with the shown construction, this occurs by controlling the oscillator 2 closest to the transformer 8 and on the basis of a detection of the load on the motor by reading the succession of pulses in any feed conductor for the motor current in the comparator 3. This often gives rise to a modified control voltage from the transformer 8 which at 15 is transferred to the oscillator 2 and controls this in order to change its frequency.

The diagram in FIG. 2 shows the pulse shape of the signal which is tapped from the feeder conductor 10 at 16 and lead to the comparator 3. In this way it can be seen that after each operating pulse 18, a pulse 19 is produced by a driving EMF when the stator field is passed by the induced field from the rotor windings with the necessary slip for producing the rotor field. In a corresponding manner a voltage reduction 21 is produced with a new pulse 20 by means of a back-EMF. Both these deviations from the pure pulse have a voltage level which is dependent on the size of the slip. The larger the slip is, the larger will also be the induced rotor current and along with these the driver-EMF and the back-EMF will also increase. These variations in the voltage level are marked with dotted lines within the portions 19 and 21. This pulse train is changed in the comparator 3 such that it is comprised of pure square pulses between determined voltages levels. Thus the width of the pulse for those pulses which correspond to the pulses 19 and 21 will have a variation in pulse length which is directly proportional to the variation in voltage level in the pulse according to FIG. 2. This transformed pulse is shown in FIG. 3. FIG. 4 shows how this varying pulse train is separated so that only pulses which represent voltage reductions 21 are fed out of the separator at 25 in FIG. 1 to the transformer 8. In turn this gives a direct current having a voltage level which changes with the size of the pulses 24 from the separator 7.

This is shown in FIG. 5 by means of voltage levels where a larger slip is indicated with a continuous line and a lesser one with a dotted line. In this way the modifiable control signal at 15 to the voltage-controlled oscillator 2 has been attained.

Thus the control of the same is so arranged that an increasing voltage due to increased slip gives a reduced frequency from the oscillator and thereby a reduced rotational speed of the motor. With operating conditions where the torque load is dependent on the rotational speed, the torque requirement with increased additional loading can be reduced if the motor's rotational speed is allowed to reduce. If this can occur automatically as achieved according to the invention, an adaptation of the motor's operating function to varying operating conditions will thus be obtained. This is not possible with an asynchronous motor operated at a fixed frequency since this can only work within a limited interval with respect to the synchronous rotational speed.

With reducing torque loading and reducing slip, a rotational speed increase is obtained which is limited to one value since the oscillator is adapted to give a predetermined maximum frequency. With the help of four resistors 26, 27, 28 and 29 it can be determined in the comparator at which loading, and consequently slip, the comparator shall be activated. The voltage change 19, 21 (FIG. 2) is divided at the point between the resistors 26 and 29. When the voltages becomes larger than at the point between 27 and 28 the comparator is activated to give a signal to the separator 7. The separator separates the required pulse from other signals as shown in FIG. 3. By using changed conditions between the resistors 26 and 29 one can predetermine the rotational torque of the motor.

A control of an asynchronous motor with the help of the control device according to the invention is particularly advantageous for cases of loading where the torque reduces with reducing rotational speed. Such is the case with pump operation and fan operation. An increased flow thus gives rise to increased resistance and therewith an increased torque requirement. Conversely the reduced resistance gives rise to the need for an increased flow if a certain pressure is to be maintained.

During operation under such conditions with a rotor having at least virtually constant rotational speed, an increased pressure, but above all, large losses, arise in the pump housing upon increased flow resistance, for example when the flow is regulated with valves during operation with an acceleration pump/fan (of the centrifugal type for example), said losses being given off as heat.

Significantly better and more economical operation conditions can be achieved if the rotational speed can be varied according to the resistance in a self-regulating manner such as is achieved by the invention.

The device according to the invention moreover gives better start conditions than are normally achieved with an asynchronous motor. At the moment of starting the slip can be said to be total. This gives a very low torque for starting-up and therefore it is generally not possible to use asynchronous motors where any appreciable starting torque exists. If it is however desired to use asynchronous motors these must be, in such a case, foreseen with some type of auxiliary windings for starting. With the device according to the invention, a starting cycle is however achieved via the variable frequency of the oscillator, which permits torque loading even at standstill.

I claim:

1. A device for controlling an asynchronous type electric motor, comprising: a motor having at least stator windings, feed conductors and a rotor, said motor operated by means of a three-phase alternating current creating a rotating magnetic field in the motor, to provide a required field for rotation of the rotor, said rotating magnetic field inducing a field upon a certain rotational speed slip from synchronous rotational speed of the rotor, an oscillator producing an operating current for the motor, a generator alternating a voltage, said operating current being frequency-controlled by said oscillator and fed from a source of direct current, the oscillator having an output frequency defined by level of input control voltage, the controlling device being arranged to receive a pulse generated in the feed conductors during operation of the motor for alternating the operating current, the controlling device being arranged to detect changes in shape of the pulse of the operating voltage occurring due to electromotive forces induced within the stator windings upon passing said windings by the induced field of the rotor, said changes varying in size according to a size of the slip, and to induce a proportional voltage based on a level of said changes, said voltage being transferred to the oscillator for frequency control, whereby said control voltage and frequency of the oscillator are changed along with changes in rotational torque loading of the motor and thereby the rotational speed of the motor is changed achieve adaptation to the operating resistance.

2. The device according to claim 1, wherein the controlling device further comprises a comparator arranged to transform the level of changes from the operating voltage to a pulse train having length varied proportionally with the changes in the operating voltage level, said pulse train being transformed within a control device of a transformer into a direct current, a voltage of said direct current being dependent upon the length of the pulse train, said direct current being further directed to the oscillator for controlling thereof.

3. The device according to claim 2, wherein a separator is provided between the comparator and the transformer for separation for the length-varying pulses, said separator determining the slip from other pulses in a signal generated by the comparator.

\* \* \* \* \*

UNITED STATES PATENT AND TRADEMARK OFFICE
CERTIFICATE OF CORRECTION

PATENT NO. : 5,459,387
DATED : October 17, 1995
INVENTOR(S) : Wlodzimierz Cwejman It is certified that error appears in the above-identified patent and that said Letters Patent is hereby corrected as shown below:

Column 1, line 66, delete "en" and insert therefor --on--.
Column 5, line 15, before "shape" insert --a--.
Column 6, line 3, after "changed" insert --to--.

Signed and Sealed this

Twenty-third Day of January, 1996

Attest:

BRUCE LEHMAN

Attesting Officer        Commissioner of Patents and Trademarks